(12) United States Patent
Weinblatt

(10) Patent No.: US 8,195,510 B2
(45) Date of Patent: Jun. 5, 2012

(54) TECHNIQUE FOR ELIMINATING FRAUDULENT USE OF PRINTED COUPONS

(76) Inventor: Lee S. Weinblatt, Teaneck, NJ (US)

(*) Notice: Subject to any disclaimer, the term of this patent is extended or adjusted under 35 U.S.C. 154(b) by 414 days.

(21) Appl. No.: 12/290,829

(22) Filed: Nov. 3, 2008

(65) Prior Publication Data

US 2009/0204494 A1    Aug. 13, 2009

Related U.S. Application Data

(60) Provisional application No. 61/001,539, filed on Nov. 1, 2007.

(51) Int. Cl.
*G06Q 30/00*    (2012.01)

(52) U.S. Cl. .................................. 705/14.26; 705/50

(58) Field of Classification Search .......... 705/14, 705/50
See application file for complete search history.

(56) References Cited

U.S. PATENT DOCUMENTS

| | | | | |
|---|---|---|---|---|
| 5,192,854 A * | 3/1993 | Counts | | 235/375 |
| 5,708,782 A * | 1/1998 | Larson et al. | | 705/14.23 |
| 5,884,278 A * | 3/1999 | Powell | | 705/14.26 |
| 6,766,301 B1 * | 7/2004 | Daniel et al. | | 705/14.26 |
| 7,257,545 B1 * | 8/2007 | Hung | | 705/14.26 |
| 7,464,868 B2 * | 12/2008 | Brown et al. | | 235/383 |
| 2001/0001145 A1 * | 5/2001 | Barnett et al. | | 705/14 |
| 2002/0048369 A1 * | 4/2002 | Ginter et al. | | 380/277 |
| 2002/0112159 A1 * | 8/2002 | Platt | | 713/168 |
| 2002/0128903 A1 * | 9/2002 | Kernahan | | 705/14 |
| 2002/0194069 A1 * | 12/2002 | Thakur et al. | | 705/14 |
| 2002/0198777 A1 * | 12/2002 | Yuasa | | 705/14 |
| 2003/0023482 A1 * | 1/2003 | Messner et al. | | 705/14 |
| 2003/0163373 A1 * | 8/2003 | Cornateanu | | 705/14 |
| 2004/0215510 A1 * | 10/2004 | Wilkie | | 705/14 |
| 2006/0053437 A1 * | 3/2006 | Bruner | | 725/23 |
| 2007/0150339 A1 * | 6/2007 | Retter et al. | | 705/14 |
| 2007/0174259 A1 * | 7/2007 | Amjadi | | 707/3 |
| 2007/0244745 A1 * | 10/2007 | Boal | | 705/14 |
| 2008/0052169 A1 * | 2/2008 | O'Shea et al. | | 705/14 |

OTHER PUBLICATIONS

Holt, Karen. "Coupon Crimes," Promo, Apr. 2004.*
"Mobile Tickets for SMS Enthusiasts-NeoMedia's Gavitec Brings Mobile Ticketing to the Philippines," Marketwire, Oct. 31, 2007.*

* cited by examiner

*Primary Examiner* — Michelle Tarae
(74) *Attorney, Agent, or Firm* — Cozen O'Connor

(57) ABSTRACT

A method for redeeming coupons, comprising the steps of storing on an electronic device an electronic coupon having encrypted data and unencrypted data, wherein the encrypted data is required for printing the coupon; reading data stored on the portable electronic device at purchase location, and comparing the unencrypted data with product data obtained at the purchase location, and if a match is detected, decrypting the encrypted data; and printing the coupon at the purchase location with the decrypted data.

14 Claims, 2 Drawing Sheets

TECHNIQUE FOR ELIMINATING FRAUDULENT USE OF PRINTED COUPONS

RELATED APPLICATION

This application claims the benefit of U.S. Provisional Application No. 61/001,539 filed Nov. 1, 2007.

FIELD OF THE INVENTION

The present invention is directed to a technique for eliminating the fraudulent use of printed coupons.

BACKGROUND OF THE INVENTION

The use of paper coupons by consumers to take advantage of discounts offered on purchased items is widespread. In the United states of America, it is a 1.4 billion dollars per year business. However, the use of such coupons brings with it various disadvantages.

For example, from the retailer's point of view, with the sophisticated imaging technology widely available today, printed coupons can be duplicated and made to appear as originals. Consequently, an advertising program based on the potential of a known number of coupons being redeemed can be overwhelmed with a much higher number of redemptions than expected due to such fraudulent copying. Also, coupons are validated by sending them from the retailer to a processing center. The retailer is paid by the advertiser for the coupon amount if the coupon can be properly processed. However, if the processing center cannot read the coupon properly, perhaps due to fraudulent duplication or modification, the retailer sustains a loss because the retailer has already given the discount to the consumer but cannot recover it for itself from the advertiser.

From the point of view of consumers, printed coupons can also be troublesome because sometimes a consumer may forget it at home, or the desired coupon cannot quickly be located in a pile of coupons while the person is at the cash register with a long line of people waiting to check out, and so on. In addition, the desire for a product might be stimulated by a television commercial, but the paper coupon is printed in a newspaper. The time gap from seeing the TV commercial and then coincidentally coming across the right coupon in a newspaper might be so long that the stimulated interest would have diminished in the meanwhile.

SUMMARY OF THE INVENTION

It is desirable to develop a system that includes the following features:
1. Provide an electronic coupon while also maintaining the convenience of a printed coupon that can be redeemed for a consumer by a retailer and then sent to a processing center for validation.
2. Make the electronic/printed coupon immune to fraudulent copying by consumers.
3. The coupon must be made quickly and conveniently available for retention by the consumer in association with an advertisement for the product to which the coupon applies.
4. The coupon must be made reliably and conveniently accessible to the consumer at the time of redemption by the retailer.

One aspect of the present invention is directed to a method for redeeming coupons, comprising the steps of storing on an electronic device an electronic coupon having encrypted data and unencrypted data, wherein the encrypted data is required for printing the coupon; reading data stored on the portable electronic device at purchase location, and comparing the unencrypted data with product data obtained at the purchase location, and if a match is detected, decrypting the encrypted data; and printing the coupon at the purchase location with the decrypted data.

Another aspect of the present invention is directed to a method for redeeming coupons at a purchase location, comprising the steps of reading an electronic coupon having encrypted data and unencrypted data, wherein the encrypted data is required for printing the coupon; comparing the unencrypted data with product data obtained at the purchase location, and if a match is detected, decrypting the encrypted data; and printing the coupon at the purchase location with the decrypted data for immediate redemption.

DETAILED DESCRIPTION OF THE DRAWINGS

Figure 1:
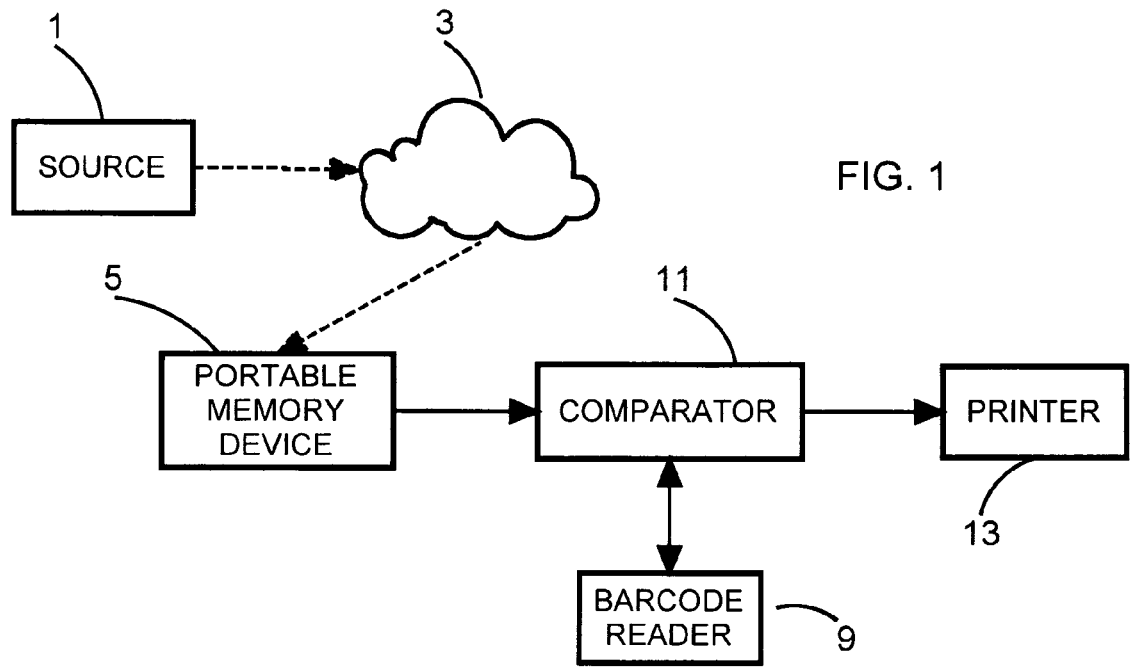
FIG. 1 is a schematic block diagram showing a first embodiment of the invention.

FIG. 1 is directed to a first embodiment of the present invention. Specifically, the consumer obtains a coupon electronically in accordance with some known technique. For example, electronic coupons are available from a source 1 for downloading via the Internet 3. The electronic coupon is stored, preferably on portable memory device 5. For example, such a device can be a fob inserted into the USB port of a computer located in the consumer's home. The consumer can initiate the download while watching a TV commercial, for example. The electronic data for reproducing (e.g. printing) the coupon is encrypted. The encrypted coupon is designed so that it cannot be modified electronically by the consumer. The downloaded data for each coupon also includes unencrypted data. Such unencrypted data can be readily used to provide human intelligible information which identifies the coupon, such as by the product to which the coupon applies.

When the consumer comes to the purchase location, such as a supermarket, she takes the portable memory device 5 with her. At the retailer, the consumer completes her shopping and then comes to the checkout counter. All the purchased items are scanned with barcode reader 9 in the common, well known way. The consumer then hands device 5 to the cashier who inserts it into the POS (point-of-sale) terminal, which includes a comparator 11. The comparator compares the signal from barcode reader 9 for each item with the readable data from device 5. If a purchased product, as identified from being scanned by barcode reader 9, is matched by a product identified on device 5, the comparator decodes the encrypted electronic coupon and proceeds to print it with printer 13, which can be part of the POS terminal.

The encrypted electronic coupon can be decoded by circuitry that is a part of comparator 11 or by a separate decoder component (not shown) responsive to the output of comparator 11 and receiving data stored in device 5. Also, the decoding can be performed by software resident and executed on a data processor that is part of the POS terminal.

Figure 2:
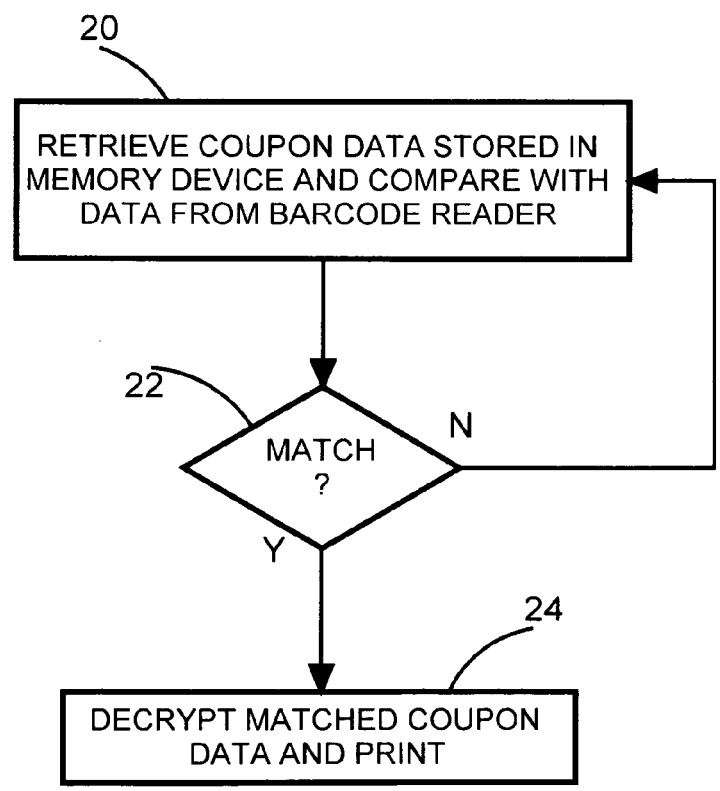
FIG. 2 is a flowchart of operations performed by the first embodiment.

As shown in FIG. 2, the operation of the comparator 11 includes step 20 for retrieving the readable (i.e. unencrypted) stored coupon data from device 5. The readable coupon data is compared in step 22 with the data obtained from barcode reader 9. If a match is found, then in accordance with step 24, the encrypted data of the matched coupon is decrypted, and then it is printed by printer 13.

Figure 3:
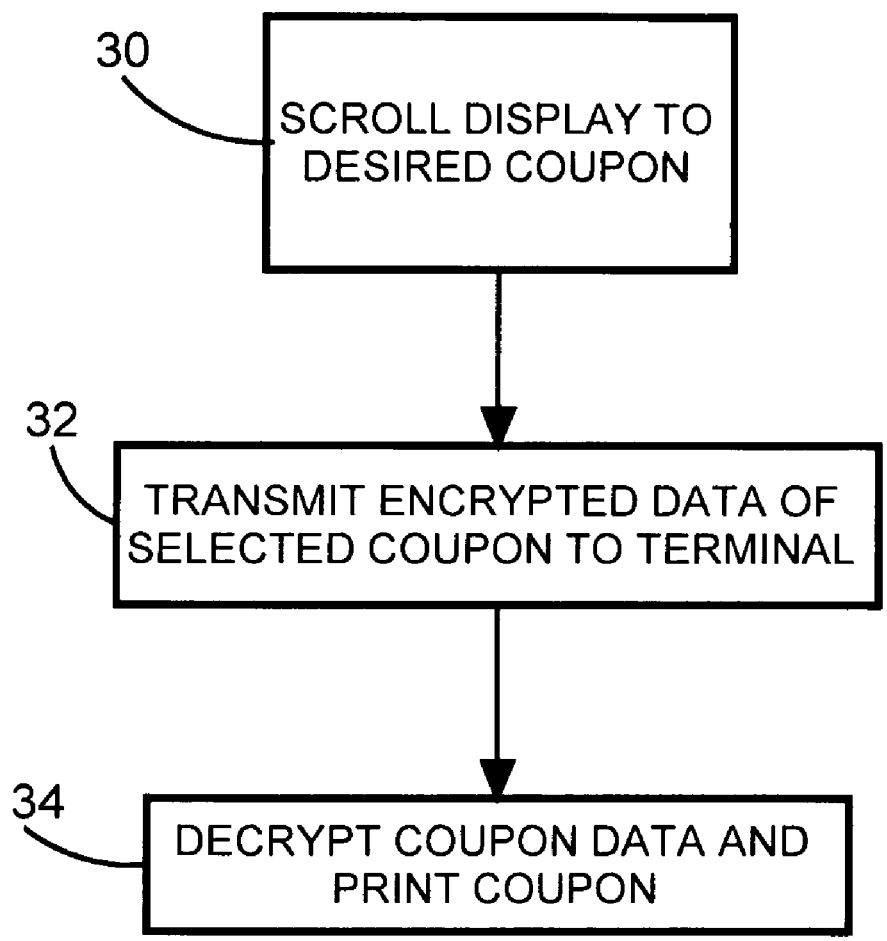
FIG. 3 is a schematic block diagram showing a second embodiment of the invention.

FIG. 3 shows a second embodiment of the present invention which utilizes an iPod-like (iPod is a trademark of Apple, Inc.) device that includes a memory and a display screen. Just as with the previous embodiment, the coupon data is downloaded via the Internet into the memory of the iPod. However, with this embodiment the identification of the coupon can be displayed on the screen for the consumer. For example, the identification can be the name of the product to which the coupon applies, and perhaps also the size of the container. In accordance with step 30, the consumer quickly scrolls through the stored coupons to find the desired one she wishes to redeem pertaining to the products that she has purchased and then, upon actuation by the shopper, the related coupon data is wirelessly transmitted by the device in accordance with step 32 to the POS terminal. Pursuant to step 34, the POS terminal decrypts the coupon data and then prints the coupon.

A further refinement of this technique utilizes the capability of the iPod to receive signals wirelessly while the consumer is shopping. Via a Bluetooth transmission, for example, a coupon can be transmitted electronically by the supermarket to every shopper who walks down a particular aisle. Thus, if the shopper is near some coffee products, the supermarket might transmit a coupon for a particular brand of coffee. That coupon will be detected and stored by compatible devices present in that aisle, such devices being in or on the iPod. That coupon will appear instantaneously on the iPod's screen, preferably accompanied by some audible alert signal and/or or vibration. This may encourage an immediate purchase of such products by the consumer. As described above in connection with FIG. 3, when the consumer comes to the checkout counter, that coupon which was picked up from the transmission in the aisle can be located by scrolling and presented for redemption.

As will be readily apparent from the description provided above, this technique has the advantage to the retailer of preventing fraud by the consumer because neither the electronic coupon nor the paper coupon is ever accessible to the consumer for possible fraudulent action. Likewise, the advantage to the retailer is that a paper coupon is produced so that this simple and convenient way of validating a coupon by the processing center is retained for continued use in the future, but fraud free in accordance with the invention.

It will be readily understood that the inclusion of a fob and an iPod in the description is just for convenience. Various other components and devices can be readily substituted for these by anyone with ordinary skill in the art. Also, the coupon data can be stored and remain at the consumer's home, for example, while the consumer is shopping. Once the products are brought to the checkout counter, the POS terminal can be arranged to access the coupon data via suitable communications apparatus, or the coupon data can be transmitted by the consumer to the purchase location prior to departure of the consumer from home to the purchase location. These approaches as well as others are available and readily adaptable in accordance with this invention to store coupon data initially at the consumer's home, and then to make that data available for implementation of step 20 at the purchase location. Also, although the invention has been discussed above in connection with products such as those that can be purchased in a supermarket, it should be understood that the word "products" is used herein to include anything that can be purchased, even services such as theater performances, hair salon services, health club services, and so on.

I claim:

1. A method for redeeming coupons, comprising the steps of:
   storing on an electronic device an electronic coupon having encrypted data and unencrypted data, wherein the encrypted data is required for printing the coupon;
   reading data stored on the electronic device at a purchase location, comparing the unencrypted data with product data obtained at the purchase location and, if a match is detected, decrypting the encrypted data; and
   printing the coupon at the purchase location with the decrypted data.

2. The method of claim 1, wherein the electronic device is a portable electronic device.

3. The method of claim 1, wherein the electronic coupon is stored on the electronic device in response to a manual command activated by a consumer.

4. The method of claim 3, wherein the manual command is actuated while the consumer is exposed to an advertisement of the product.

5. The method of claim 2, wherein the electronic coupon is automatically transmitted to the portable device by communication apparatus located at the purchase location.

6. The method of claim 1, wherein the product data is obtained by scanning a bar code on a purchased product.

7. The method of claim 1, wherein the unencrypted data is displayed as human intelligible information.

8. The method of claim 1, wherein the unencrypted data identifies a product to which the coupon applies.

9. The method of claim 1, comprising immediate redemption of the printed coupon at the purchase location.

10. A method for redeeming coupons at a purchase location, comprising the steps of:
    reading an electronic coupon having encrypted data and unencrypted data, wherein the encrypted data is required for printing the coupon;
    comparing the unencrypted data with product data obtained at the purchase location, and if a match is detected, decrypting the encrypted data; and
    printing the coupon at the purchase location with the decrypted data for immediate redemption.

11. The method of claim 10, wherein the electronic coupon is stored on a portable electronic device.

12. The method of claim 10, wherein the product data is obtained by scanning a bar code on a purchased product.

13. The method of claim 10, wherein the unencrypted data is displayed as human intelligible information.

14. The method of claim 10, wherein the unencrypted data identifies a product to which the coupon applies.

\* \* \* \* \*